Figure 6:
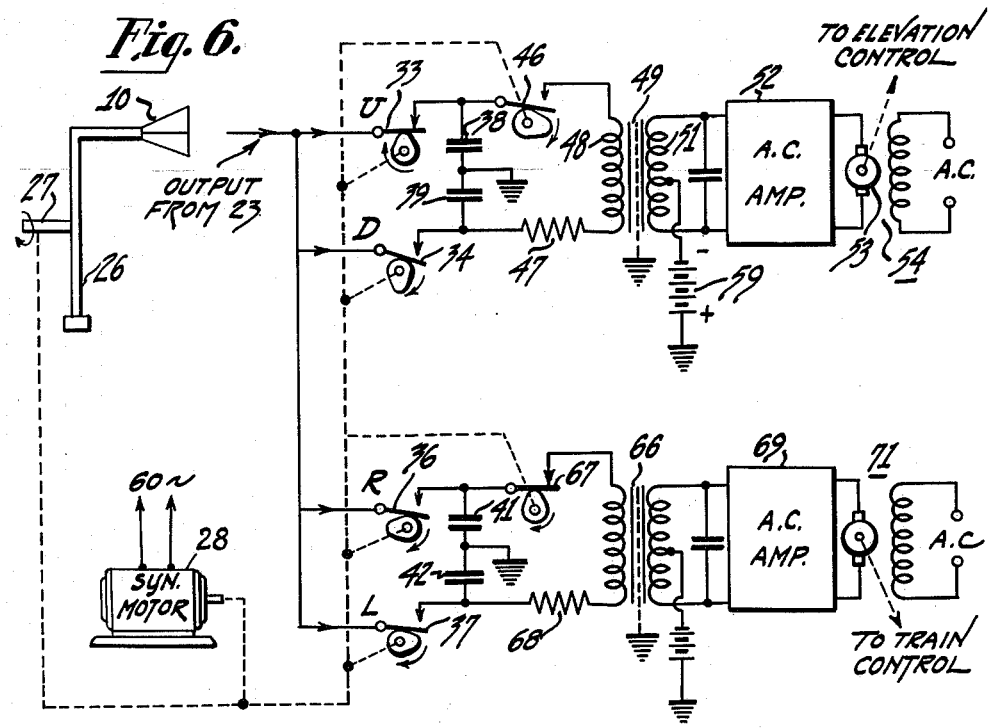

Oct. 14, 1952     T. T. EATON     2,614,249
AUTOMATIC STEERING SYSTEM
Filed Oct. 9, 1946     2 SHEETS—SHEET 1
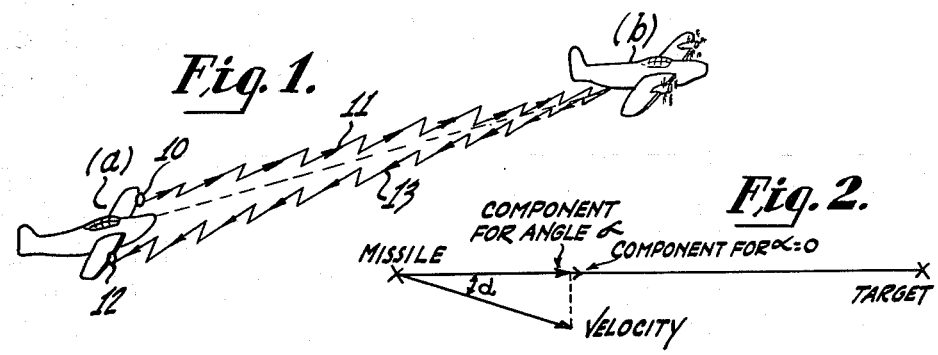
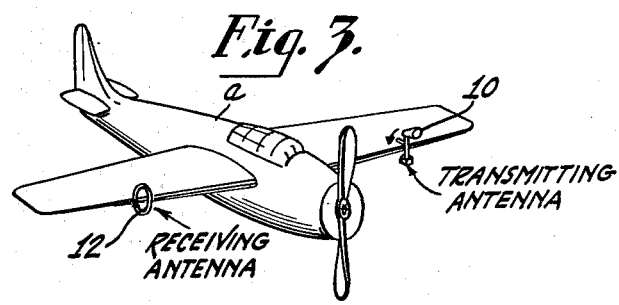
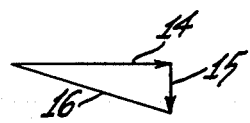
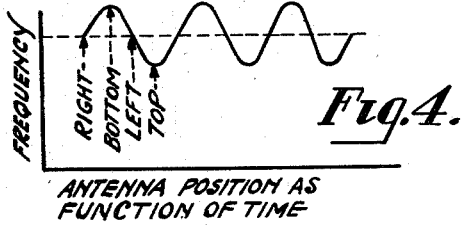
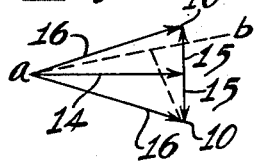
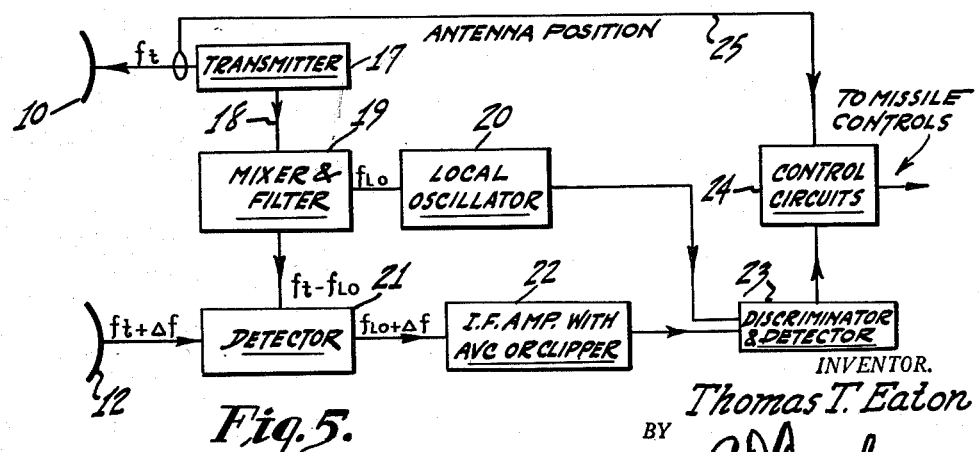
INVENTOR.
Thomas T. Eaton
BY
ATTORNEY Patented Oct. 14, 1952

2,614,249

UNITED STATES PATENT OFFICE 2,614,249

AUTOMATIC STEERING SYSTEM

Thomas T. Eaton, Haddon Heights, N. J., assignor to Radio Corporation of America, a corporation of Delaware Application October 9, 1946, Serial No. 702,109

7 Claims. (Cl. 343—7)

This invention relates to guiding systems which are adapted to steer a moving vehicle automatically to a desired harbor which may be stationary or may be in the form of another moving vehicle such as an aircraft or the like.

Various types of automatic guiding systems have been provided in the past for automatically steering a water borne vehicle into a stationary harbor. Similar types of guiding systems have been provided for automatically steering a bomb or missile into contact with a moving aircraft. The guiding propulsion system of the present invention is distinguished from such prior systems by the fact that its operation is controlled by an alternating potential having a frequency which is the resultant difference between the frequency of a radio wave transmitted from the moving vehicle to the harbor or target and the frequency of that part of such radio wave as is reflected back from the harbor or target to the moving vehicle.

In the case where a radio transmitter and a radio receiver are mounted on a moving vehicle, it is well known that the frequency of the wave emitted by the transmitter is different from the frequency of that part of the wave which is reflected from an external object back to the receiver. Such frequency difference (sometimes termed the Doppler shift) for the velocities involved is proportional to the speed of the vehicle with respect to the harbor or target. Thus the received signal has a frequency which is relatively high when the vessel is approaching the harbor or target and is relatively low when the vehicle is receding from the harbor or target.

It is evident that this frequency shift will be greatest when the course of the moving vehicle is on a line which intersects the harbor or target. Therefore in order to make the vehicle follow a "homing" course, it is necessary to direct it so that the frequency shift is a maximum. In accordance with the present invention, this result is achieved by mounting the transmitting antenna (or the receiving antenna and reflector) on an arm which rotates about an axis parallel to the longitudinal axis of the vehicle.

In this way, vertical and horizontal velocity components are added to the velocity of the vehicle so that the frequency of the received signal is compared constantly with the frequency of the signal which would be received if the vehicle were headed above, below, to the left or to the right of the harbor or target. Although rotation of either the transmitting or receiving antenna is effective to produce the desired result, it is assumed for the purpose of illustration that the transmitting antenna is rotated about an axis parallel to the longitudinal axis of the moving vehicle.

Important objects of the invention are the provision of an improved vehicle guiding system and method of operation, the provision of an improved system whereby a "homing" missile is caused to follow a course which eventually intersects a moving object, and the provision of a vehicle guiding system which responds to the frequency shift between a transmitted signal and a reflected signal to control the course of the vehicle so that it reaches the object from which the transmitted signal is reflected.

The invention will be better understood from the following description considered in connection with the accompanying drawings and its scope is indicated by the appended claims.

Referring to the drawings:

Figure 1 is a diagrammatic showing of a moving vehicle $a$ from which a radio signal is transmitted to an object $b$ which reflects a part of such signal back to the vehicle $a$, Figure 2 is an explanatory diagram relating to the velocity components involved in the relation between the vehicle $a$ and the object $b$ of Figure 1, Figure 3 illustrates a moving vehicle having its transmitting antenna arranged to rotate about an axis which is parallel with the longitudinal axis of the vehicle, Figures 3a, 3b, 3c and 4 are explanatory diagrams relating to the operation of the vehicle of Figure 3, Figure 5 is a box diagram of the improved propulsion system, and Figure 6 is a wiring diagram of that part of Figure 5 which is designated as "Control Circuits."

Figure 1 shows a moving vehicle $a$ upon which are mounted an antenna 10 which emits a continuous wave signal 11 and an antenna 12 which receives that part 13 of the signal which is reflected from an object $b$ which may be a stationary reflector or a moving vehicle such as an aircraft.

As previously indicated the frequency of the received signal differs from that of the transmitted signal by a value which is dependent on the relative motion between the vehicle $a$ and the object $b$. This frequency difference is proportional to the component of velocity along a straight line between the vehicle and the signal reflecting object. If the vehicle and object move with constant speed, the component of velocity along this line (see Figure 2) will be a maximum when the vehicle is moving directly toward the object. Therefore, the vehicle $a$ can be directed to the object $b$ by adjusting its direction of flight so that the frequency of the received signal is maintained at its maximum value.

In order to determine if the received signal is at its maximum value, it is necessary to compare the frequency of the signal actually received with the frequency of the signal which would be received if the vehicle were proceeding on a course above, below, to the right or to the left of the straight line between the vehicle and reflecting object. The direction of the movement of the vehicle could be changed to provide this information but this would require considerable power and a complicated control mechanism. A much simpler way of deriving this information is by rotation of the transmitting antenna 10 as indicated by Figure 3.

The effect of such rotation of the transmitting antenna 10 about an axis parallel to the longitudinal axis of the vehicle $a$ is shown by Figures 3a, 3b and 4.

In Figures 3a and 3b, the vector 14 represents the motion of the vehicle $a$, the vector 15 represents the motion of the antenna 10 with respect to the vehicle and the vector 16 represents the resultant of the two motions. Thus when the antenna 10 is at the top of its circular path (with its direction of rotation as indicated by the arrow) the resultant motion is to the right of the straight line between the vehicle and reflecting object as indicated by the vector 16 of the Figure 3a. Likewise when the antenna is at the bottom of its circular path, the resultant motion is to the left of this straight line as indicated by the vector 16 of Figure 3b. In between these positions, the vector 15 (representing the movement of the antenna 10 with respect to the vehicle $a$) rotates about the end of the vector 14 which represents the movement of the vehicle.

In this way is produced a scanning effect similar to that of the well known conical scan radar with the exception that in this instance the velocity of the vessel is scanned instead of the direction of a radio beam.

It is evident that if the vehicle is moving directly toward the reflecting object, the rotation of the antenna 10 will not affect the frequency of the received signal and no control effect will be exerted on the steering elements of the vehicle. This is so for the reason that the length of the resultant vector 16 (Figure 3a and Figure 3b) varies only with change in the velocity of the vehicle. If the vehicle is moving to the right of its direct course $ab$, for a given direction of antenna rotation and relative motion of $(a)$ and $(b)$, the frequency of the received signal will be less when the antenna $(a)$ is at the top of its circular path than when it is at the bottom of this path. This follows from the fact that the movement of the antenna 10 with respect to $(b)$ (see Figure 3c) is greatest in the direction away from $(b)$ when the antenna is at the top of its travel. Similar considerations apply when the vehicle is moving from its direct path in other directions not too far away from the direction of the reflecting object.

The frequency of the signal received when the course of the vehicle is to the right of the reflecting object is indicated by Figure 4. Here the amplitude of the wave provides a measure of how far the vehicle is off its direct course and the phase of the wave indicates the direction of the error.

This information is converted into a usable form by the apparatus of Figure 5. This apparatus includes a transmitter 17 from which a continuous wave radio signal is transmitted (1) through the antenna 10 to the reflecting object $b$, and (2) through a lead 18 to a mixer and filter 19. In the device 19, the signal $f_t$ from the transmitter 17 is heterodyned with a signal $f_{LO}$ from a local oscillator 20 to produce an intermediate frequency signal $f_t - f_{LO}$ which is fed to a detector 21. Also fed to the detector 21 is the signal $f_t + \Delta f$ which is reflected from the object $b$ to the antenna 12. The detected signal $f_{LO} + \Delta f$ is amplified in an amplifier 22 and supplied through a discriminator and second detector 23 to the control circuits 24 of the moving vehicle $a$. The line 25 between the antenna 10 and the control circuits 24 represents a mechanical coupling through which certain circuit control cams (described in connection with Fig. 6) are operated in synchronism with rotation of the antenna.

These various circuit elements are for the most part of conventional form and easily understood without detailed consideration. The connections of the control circuits 24 and those by means of which the "antenna position" representative potential is derived are shown in Figure 6 hereinafter described.

It is desirable that the transmitter 17 have very good frequency stability for times of the order of the rotational period of the antenna 10 and that the frequency stability of the local oscillator 20 also be good. The lower side frequency of the heterodyned signal $f_t \frac{1}{3} f_{LO}$ is filtered out in the device 19 and is mixed with the received signal $f_t + \Delta f$ in the first detector 21. It is evident that the variations in the transmitter frequency are cancelled out under these conditions so that the band width of the intermediate frequency amplifier 22 need be only wide enough to accommodate the frequency shift $\Delta f$ together with variations in the frequency of the local oscillator 20.

In order that the amplitude of the output potential of the second detector be truly representative of the frequency shift $\Delta f$, it is necessary that the output voltage of the intermediate frequency amplifier 22 be held constant. This can be done either by means of an automatic volume control or with a clipper as is customary in frequency modulation receivers. The output of the second detector is a sinusoid having (1) an amplitude which indicates how far the vehicle $a$ is off its direct course and (2) a phase which is constant so long as the vessel $a$ is on its true course but shifts in a direction dependent on the course of the vessel $a$ when this travel $a$ is off its true course. This sinusoid is utilized to operate the controls of the vehicle in a manner to constantly return it to its direct course.

The details of the control circuits are indicated by Figure 6.

The mechanism for rotating the transmitting antenna 10 may assume various forms. It is shown as mounted at one end of an arm 26 which may have a counterweight at its opposite end and is arranged to rotate with a shaft 27 driven by a motor 28.

Also driven by the motor 28 are a plurality of cam controlled switches 33, 34, 36 and 37 which connect the output lead of the discriminator and detector 23 (Figure 5) successively to the ungrounded terminals of the capacitors 38, 41, 39 and 42 so that the charges of these capacitors are determined by the difference between the frequencies of the transmitted and received signals when the antenna is at its top, bottom, left and right positions. Thus when the antenna 10 is in its top or "U" position, the switch 33 is closed so that the output potential of 23 is applied to the capacitor 38. Likewise the switch 34 is closed in the bottom or "D" position, the switch 36 is closed in the right or "R" position and the switch 37 is closed in the left or "L" position.

So long as the vehicle $a$ is on a direct course to the object $b$, the capacitors 38 and 39 are maintained at the same voltage so that they produce no resultant voltage at their output leads. These leads are interconnected through a resistor 47, the primary 48 of a transformer 49 and a cam switch 46 which is rotated by the motor 28 to close the primary circuit 48 at a time when the switches 33 and 34 are open. When the vehicle $a$ is off its direct course, however there is produced a resultant voltage which is applied through the secondary winding 51 and an amplifier 52 to a motor 54 by which the elevation control of the vehicle is operated to return the vehicle to its direct course.

The train control of the vehicle $a$ is similar to its elevation control and operates in the same way to return the vehicle to its direct course when a resultant potential other than zero is applied through the switch 67, the transformer 66 and the amplifier 69 to the train amplifier 69 to the train control motor 71.

An important feature of the invention is the provision of means for utilizing the frequency difference between the transmitted and received signals to detect slight deviations of the vehicle from its direct course and to immediately exert a force by which such deviation is corrected.

I claim as my invention:

1. In combination, radar apparatus comprising an antenna system that comprises at least one antenna having a directive radiation pattern that has a principal axis, said antenna system being mounted on means for pointing said axis of said one antenna toward a reflecting target, means for repetitively changing the effective position of said one antenna in a direction having a component transverse to said principal axis, means for radiating a radio signal from said antenna system during the time that said one antenna is changing from one effective position to another effective position, means for receiving said signal by said antenna system after reflection from said target, means for obtaining a Doppler frequency signal resulting from relative motion of said target and said one antenna, said last means comprising a detector, means for supplying a frequency comparison signal to said detector and means for supplying said received signal to said detector, whereby there is obtained a Doppler frequency signal that varies repetitively in frequency as a function of said repetitive change in the effective position of said one antenna so long as said principal axis is not pointing directly toward said target.

2. In combination, radar apparatus comprising an antenna system that comprises at least one antenna having a directive radiation pattern that has a principal axis, said antenna system being mounted on means for pointing said axis of said one antenna toward a reflecting target, means for repetitively moving said one antenna in a direction having a component transverse to said principal axis, means for radiating a radio signal from said antenna system while said one antenna is moving, means for receiving said signal by said antenna system after reflection from said target, means for obtaining a Doppler frequency signal resulting from relative motion of said target and said one antenna, said last means comprising a detector, means for supplying a frequency comparison signal to said detector and means for supplying said received signal to said detector, whereby there is obtained a Doppler frequency signal that varies repetitively in frequency as a function of said repetitive motion of said one antenna so long as said principal axis is not pointing directly toward said target.

3. In combination, radar apparatus comprising an antenna system that comprises at least one antenna having a directive radiation pattern that has a principal axis, said antenna system being mounted on means for pointing said axis of said one antenna toward a reflecting target, an arm rotatable about a pivot point, said one antenna being mounted on one end of said arm remote from said pivot point, means for spinning said arm and thereby moving said one antenna in a direction having a component transverse to said principal axis while said one antenna is moving, means for radiating a radio signal from said antenna system, means for receiving said signal by said antenna system after reflection from said target, means for obtaining a Doppler frequency signal resulting from relative motion of said target and said one antenna, said last means comprising a detector, means for supplying a frequency comparison signal to said detector and means for supplying said received signal to said detector, whereby there is obtained a Doppler frequency signal that varies repetitively in frequency as a function of the repetitive change in the position of said one antenna so long as said principal axis is not pointing directly toward said target.

4. In combination, radar apparatus comprising an antenna system that comprises at least one antenna having a directive radiation pattern that has a principal axis, said antenna system being mounted on means for pointing said axis of said one antenna toward a reflecting target, means for repetitively changing the effective position of said one antenna in a direction having a component transverse to said principal axis, means for radiating a radio signal from said antenna system during the time that said one antenna is changing from one effective position to another effective position, means for receiving said signal by said antenna system after reflection from said target, means for obtaining a Doppler frequency signal resulting from relative motion of said target and said one antenna, said last means comprising a detector, means for supplying a frequency comparison signal to said detector and means for supplying said received signal to said detector, whereby there is obtained a Doppler frequency signal that varies repetitively in frequency as a function of said repetitive change in the effective position of said one antenna so long as said principal axis is not pointing directly toward said target, and means for converting said Doppler frequency signal into control signals, and means for moving said antenna system as a function of said control signals to point said principal axis toward said target.

5. Radar apparatus for guiding a steerable device toward a target comprising in combination, an antenna system that comprises at least one antenna having a directive radiation pattern that has a principal axis, said antenna system being mounted on said steerable device whereby said axis of said one antenna may be pointed toward said target by steering said device toward said target, means for repetitively changing the effective position of said one antenna in a direction having a component transverse to said principal axis, means for radiating a radio signal from said antenna system during the time that said one antenna is changing from one effective position to another effective position, means for receiving said signal by said antenna system after reflection from said target, means for obtaining a Doppler frequency signal resulting from relative motion of said target and said one antenna, said last means comprising a detector, means for supplying a frequency comparison signal to said detector and means for supplying said received signal to said detector, whereby there is obtained a Doppler frequency signal that varies repetitively in frequency as a function of said repetitive change in the effective position of said one antenna so long as said principal axis is not pointing directly toward said target, and means for controlling the direction of travel of said steerable device as a function of said Doppler frequency signal.

6. In combination, radar apparatus comprising an antenna system that comprises at least one antenna having a directive radiation pattern that has a principal axis, said antenna system being mounted on means for pointing said axis of said one antenna toward a reflecting target, means for repetitively changing the effective position of said one antenna in a direction having a component transverse to said principal axis, means for radiating a radio signal from said antenna system, means for receiving said signal by said antenna system after reflection from said target, means for obtaining a Doppler frequency signal resulting from relative motion of said target and said one antenna, said last means comprising a detector, means for supplying a frequency comparison signal to said detector and means for supplying said received signal to said detector, whereby there is obtained a Doppler frequency signal that varies repetitively in frequency as a function of said repetitive change in the effective position of said one antenna so long as said principal axis is not pointing directly toward said target, a frequency discriminator and a second detector through which said Doppler frequency signal is passed to obtain a periodic wave having an amplitude that is a function of the angle of said principal axis with respect to a direct line to said target and having a phase that reverses in response to said principal axis moving from one side of said direct line to the opposite side of said direct line.

7. A radar system mounted on a steerable device that is to move toward a reflecting object, said system comprising an antenna system for transmission and reception, said antenna system comprising at least one antenna, means for transmitting a radio wave from said antenna system toward said reflecting object, means for repetitively changing the effective position of said antenna in a direction having a component transverse to the line of motion of said device, means for receiving the radio wave reflected from said object, receiving means to which the received wave is supplied, said receiving means including means for heterodyning the received wave to obtain the Doppler frequency signal resulting from relative motion of said one antenna and said reflecting object, and a frequency discriminator and detector through which said Doppler frequency signal is passed to obtain a periodic wave having an amplitude that is a function of the amount of departure from the course directly toward said object and having a phase that is a function of the direction of departure from said direct course.

THOMAS T. EATON.

REFERENCES CITED

The following references are of record in the file of this patent:

UNITED STATES PATENTS

| Number | Name | Date |
|---|---|---|
| 2,409,448 | Rost et al. | Oct. 15, 1946 |
| 2,417,248 | Godet | Mar. 11, 1947 |
| 2,420,017 | Sanders, Jr. | May 6, 1947 |
| 2,421,663 | Tolson | May 6, 1947 |
| 2,422,361 | Miller | June 17, 1947 |
| 2,446,024 | Porter et al. | July 27, 1948 |
| 2,449,517 | Stout et al. | Sept. 14, 1948 |
| 2,459,117 | Oliver | Jan. 11, 1949 |
| 2,473,175 | Ridenour | June 14, 1949 |
| 2,484,651 | Rost et al. | Oct. 11, 1949 |